Patented Apr. 3, 1928.

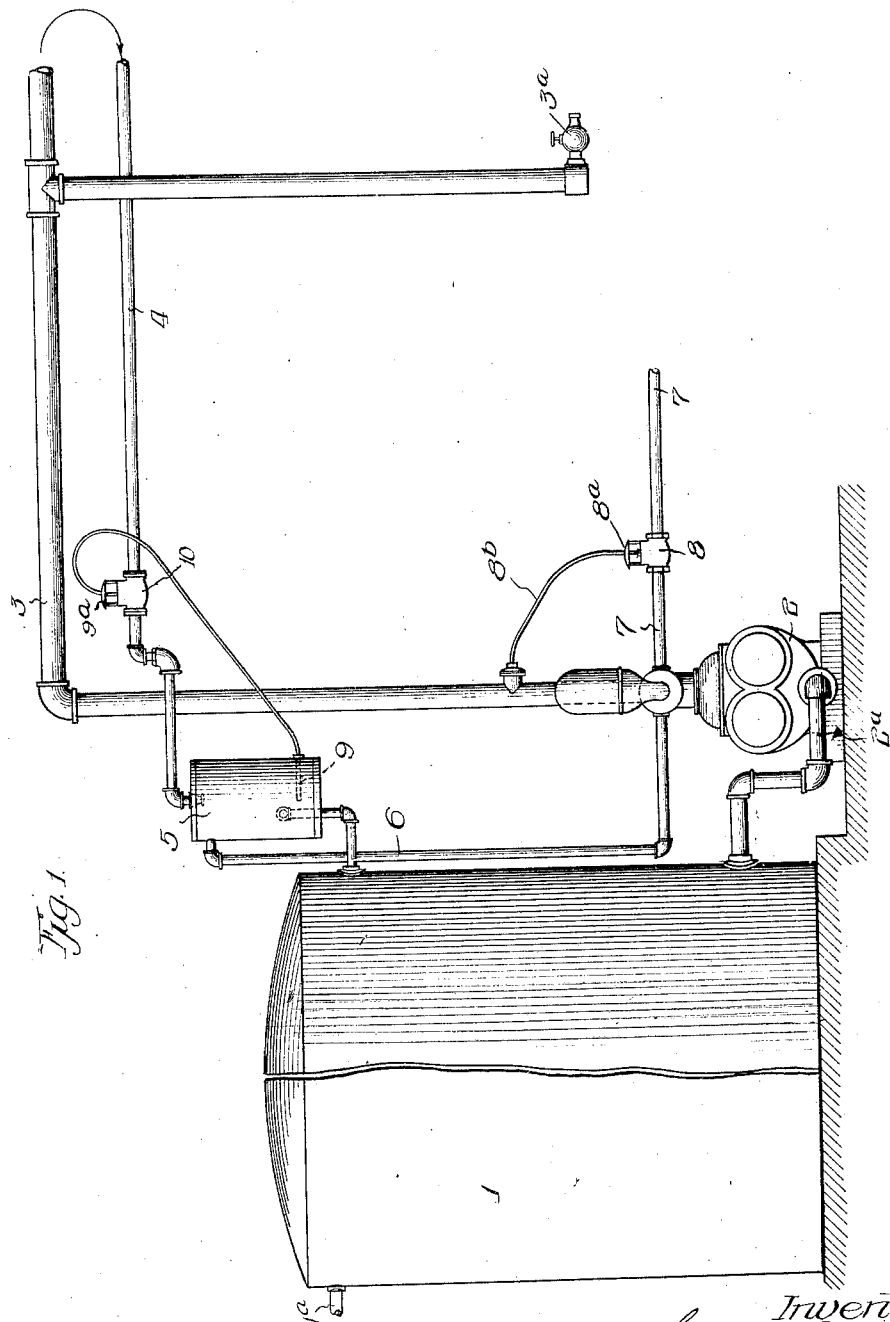

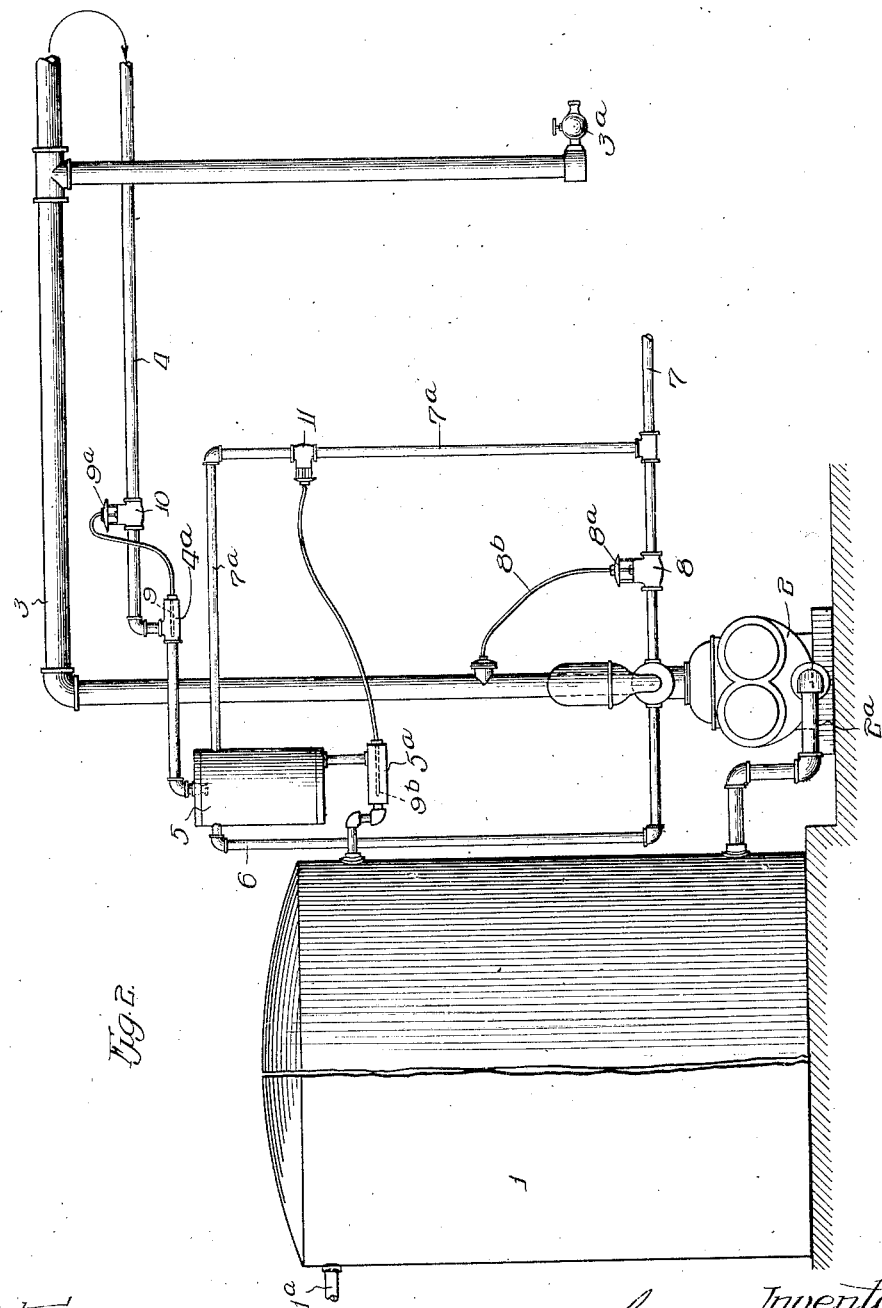

1,664,862

UNITED STATES PATENT OFFICE.

SPENCER OTIS, OF CHICAGO, ILLINOIS, ASSIGNOR TO THE LOCOMOTIVE TERMINAL IMPROVEMENT COMPANY, OF CHICAGO, ILLINOIS, A CORPORATION OF MAINE.

MEANS FOR KEEPING UP THE TEMPERATURE IN HOT-WATER-SUPPLY SYSTEMS.

Application filed September 2, 1919. Serial No. 321,274.

This invention is designed primarily for regulating temperature in hot water circulating system, as, for instance, that portion of a boiler washing and refilling system which supplies the water for refilling the boiler, or that portion which supplies the water for washing out the boiler after the boiler is blown off. The invention is applicable, however, to other systems of circulating hot water, as, for instance, a heating system, or a combined heating and boiler filling system for locomotive roundhouses.

The invention has for its object to provide for maintaining the temperature of water flowing through a supply line, for example, a line supplying hot water to the washout and filling stations of a boiler washing system, or to the radiators of a heating system, or keeping up the heat in the pipes of a circulating system to protect them against freezing in extreme weather, or a line meeting all these requirements, as, for instance, a hot water supply line in a combined boiler washing and heating system. The invention proceeds upon the principle that the temperature of the water flowing back through the return pipe to the tank or container from which the supply pipe is fed, affords a reliable indication of temperature conditions out along the line and if the temperature of the returning water be made to control the addition of heat units to the water as it reenters the supply tank, the system will be rendered self-controlling in the matter of maintenance of desired temperature.

Accordingly the invention consists primarily in introducing into the path of the returning water, at a suitable point passed by such water previously to mingling it with the main supply, a thermostat bulb or bulbs which will either directly or indirectly release for mingling with the returning water, a suitable heating medium, preferably steam, which will raise the temperature of the water flowing back into the tank in a manner to keep up the heat in the latter to a degree that will be ample for the service which is required of the water supply. By having the thermostat subject to the returning water, it will act to increase the temperature thereof, not to bring the latter to any predetermined degree, but to bring it up to such a degree as will make it ample to supply all the losses of heat whether by partial consumption of the water supply or by radiation of its contained heat along the line, and insure the necessary heat conditions throughout the circulating system regardless of heat consuming or reducing conditions at different points along the line.

In the system herein selected for illustration, the temperature-regulating medium is steam, and the thermostatic valve is adjusted to increase the volume of steam added to water that enters the filling tank whenever the temperature of water being returned to the tank falls below a predetermined degree; water, preferably from the return-flow pipe, being sprayed upon the steam in quantity sufficient to condense the same and convey the heat received therefrom into the filling tank. The steam utilized for this purpose may be either live steam, for instance, from the pipe that feeds the pumping engine, or it may be the exhaust steam from the pumping engine. In the latter case, the thermostatic valve controls the supply of steam indirectly, as, for instance, by acting upon a choke valve in the return-flow pipe, in a system where the delivery of the pump is governed by the pressure on the supply line, so that by opening the choke valve and reducing pressure in the circulating system, the pump will be accelerated, water will pass more rapidly and with less heat loss from the hot water tank, out through the supply line, and back through the return flow line, and exhaust steam being at the same time increased in volume, and being delivered into condensing relation to a spray of the return water of the system, will add heat units to water flowing back to the filling tank until the temperature of the return water itself rises to a predetermined degree.

The invention further consists in certain other features, whereby the aforesaid object may be better realized, as will be hereinafter fully set forth, said other features relating to means for automatically calling into effect an increased volume of heating medium, e. g., live steam from the pressure pipe, when the heat consumption is greater than the engine exhaust should be required to replace.

In the accompanying drawings:—

Figures 1 and 2 are schematic views showing two different methods of realizing the object of the present invention; Figure 1 showing a system employing the exhaust steam alone, and Figure 2 a system employing the exhaust steam as a primary and live steam as an auxiliary heating medium.

Referring to all of the figures, 1 represents the filling tank of a boiler filling system, or a combined heating and boiler filling system; 2 the pumping engine which receives water from the tank through a pipe $2^a$ and delivers it to a supply pipe, such as the filling line 3 having outlets $3^a$; 4 the return-flow pipe which, as suggested by the curved arrow at its right hand end, is to be understood as being connected with the supply pipe 3; 5 a spray condenser fed by the return-flow pipe; 6 a pipe which delivers exhaust steam from the pump to the condenser in relation to be condensed by the spray therein; and 7 a steam supply pipe for the pump, having a throttle valve 8 controlled by a pressure diaphragm $8^a$ which is subject to pressure in the filling line 3 through the medium of the connecting tube $8^b$, thereby rendering the pump 2 automatically variable in its output according to the consumption of water on the line, or other causes which may vary the load upon the pump for instance, the degree of back pressure maintained on the line 3, 4, by the degree of opening of the choke valve 10. Excepting the choke valve in its disclosed relation, these elements of the organization are not new in the present invention, and may correspond in the construction and relation of the parts to known systems of this kind.

Owing to changes in atmospheric temperature or for other reasons, and particularly if a supply pipe be used to supply heat for warming purposes, through a radiator that may be turned on or off at local points, the demand for heat in the supply pipe will vary greatly from time to time; moreover, the temperature in the return flow line, even in ordinary filling systems, may fall so low as to jeopardize the pipe by freezing. Thus, not only is the return-flow pipe a reliable indication of when additional heat is required in the supply pipe, but it is a portion of the system requiring protection. The present invention maintains temperature in the supply pipe 3 sufficient to meet the demands thereon and to safeguard the return-flow pipe 4, by locating a thermostat bulb such, for instance, as the bulb 9 in the path of the returning water, and utilizing the same to release an increased volume of steam to the condenser whenever the temperature of the returning water indicates that it is needed.

According to Figure 1, the thermostat bulb 9 encounters the return water after addition of the exhaust steam thereto, a sufficient body of the heated water being trapped in the bottom of the condenser to envelope the bulb. It has a diaphragm $9^a$ associated with the choke valve 10 in the return-flow pipe 4, and the thermostat is so adjusted that whenever temperature of the returning water modified by exhaust steam from pipe 6, falls below a predetermined degree the choke valve 10 will be opened, and this will so reduce pressure on the line 3, 4, that the hydro-pressure control $8^a$, $8^b$ of the steam throttle 8 will admit more steam to the pump 2 and the output of the latter will be promptly increased so as to not only circulate an increased volume of water through the line 3, 4, but materially add to the volume of exhaust steam delivered through pipe 6 to the spray condenser 5, and so build up the temperature of the filling tank 1 and prevent temperature along the line falling too low. A balance between the supply of heating medium and the consumption of heat in the water is thus maintained.

In some cases it may not be desirable to circulate the water with sufficient freedom to insure a volume of exhaust steam ample to maintain temperature, as, for instance, where the consumption of heat units on the circulating line is mainly from radiation and not through demand for filling water. Accordingly, the system shown in Figure 2 provides for delivering any required proportion of heating medium directly from the live steam pipe 7 into the spray condenser 5, preferably as a heating medium supplemental to exhaust steam from the pump passing through pipe 6 to the spray condenser 5. This is accomplished by locating a valve 11 in the branch pipe $7^a$ leading from steam pipe 7 to the spray condenser 5, and having this valve 11 controlled by the thermostat $9^b$, just as the choke valve 10 is controlled in Figure 1, by the thermostat 9, except that in the arrangement of Figure 2 the thermostat $9^b$, in order to subject it to the temperature effect of the water after receiving the steam, is located in the trap $5^a$, whereas the thermostat bulb 9 is located in trap $4^a$ where it is subject to return water before being reheated. In this arrangement the hydro-pressure valve 8, $8^a$, $8^b$ in Figure 2 can be regulated to reduce the response of the pump 2 to the relatively slight reduction in load on the circulating line induced by the opening of the choke valve 10, and still leave the pump 2 sufficiently responsive to a large drop in load resulting from the opening of a filling valve $3^a$; and instead of relying on the large increase in the volume of exhaust steam through pipe 6 during normal circulation periods, live steam through pipe $7^a$, will be introduced beneath the spray of the returning water and condensed by the latter in the condenser 5, and the temperature of water returning to the filling tank thereby insured through means of the thermostat $9^b$.

All these functions are realized directly or indirectly through the thermostats 9, 9ᵇ. It will thus be seen that in the arrangement of Figure 2, the exhaust steam through the pipe 6 will be increased in volume indirectly by, or as a result of, the opening of the choke valve 10, and an increased spray for condensing such steam will be released through said opening of the choke valve whenever a small fall in temperature of the returning water affects the bulb 9. But in case this is not sufficient to raise to the predetermined degree the temperature of water returning through the condenser 5, the additional thermostatic bulb 9ᵇ, near the bottom of the condenser, (in this instance shown introduced into the trap 5ᵃ), will act upon the valve 11 in the live steam branch 7ᵃ, and so release into the condenser 5 an additional increment of steam, which, together with the exhaust steam, will be ample for the purpose.

An important feature of the present invention, though subordinate to the broadest aspect thereof, consists in having two temperature-influencing units, of which the first unit is responsive to temperature of water as it exists at some point in the circulating system, while the second unit is responsive to the temperature of the water resulting from the action of the first unit.

Valves 10 and 11 are common in hydraulic engineering, as are their thermostatic controls 9, 9ᵇ. These elements, as commonly marketed, are adjustable at will to determine the extent to which the valves will open under a given influence, and the temperatures at which the thermostats will act. The present invention contemplates the adjustment of such elements to determine what proportion of the upkeep of temperature shall be imposed upon the increase of output of water of circulation by the water forcing device (pump 2) with the incident increase of heating medium exhausted by the latter and condensed by the returning water of circulation, and what proportion shall be attained through the opening of the auxiliary heat supply.

I claim:

1. In a water supply system, a storage tank adapted to contain water in quantity, at a temperature that adapts the water to meet a required demand, a combined supply and circulation water line having means for delivering water for consumption and means for returning unconsumed water to the tank, means for causing water to flow from the tank through said line and back to the tank, and means automatically responding to the temperature of water returning through said line, adapted to act upon the returning water of circulation and rectify its temperature before it reenters the tank.

2. In a hot water supply system, a tank adapted to store water in quantities sufficient to meet a demand whenever needed, and at a temperature required by said demand, a distributing pipe having means for delivering hot water for consumption, a circulating line leading from said distributing line back to the tank, means for causing the water to flow from the tank through said pipes and back to the tank, and a heater having controlling means automatically responsive to temperature effect of water returning through said circulating line, adapted to raise the temperature of said water immediately before it enters the tank, thereby keeping up temperature of the water stored and of the water in the distributing line.

3. In a system of hot water circulation, a tank for storing a supply of hot water to be circulated, a water circulating line through which such water normally flows, means regulated by pressure in said line for forcing water therethrough, a choke valve in said line for controlling the flow of water therethrough, and a thermostat for controlling said choke valve and which is itself subject to temperature effect of water at a selected point in the line.

4. In a system of hot water circulation, a hot water storage tank, a circulating line for receiving water therefrom and returning it thereto, a controllable water forcing device interposed in the line of circulation from and to said tank, means for controlling the output of said water forcing device, and a thermostatic device for controlling said means and which is itself subject to the temperature effect of the water of circulation at a selected point in the system outside of the tank.

5. In a system of hot water circulation, a hot water storage tank, a circulating line for receiving water therefrom and returning it thereto, a controllable water forcing device interposed in the line of circulation from and to said tank, means for controlling the output of said water forcing device, and a thermostatic device for controlling said means and which is itself subject to the temperature effect of the water of circulation at a selected point in the system outside of the tank; said output controlling means including a hydrostatic device.

6. In a system of hot water circulation, a hot water storage tank, a circulating line for receiving water therefrom and returning it thereto, a controllable water forcing device interposed in the line of circulation from and to said tank, means for controlling the output of said water forcing device, and a thermostatic device for controlling said means and which is itself subject to the temperature effect of the water of circulation at a selected point in the system outside of the tank; said output controlling means including a hydrostatic device subject to the pressure on the line, and a choke valve regulating such pressure on the line.

7. In a system of water circulation, a hot water tank, a circulating line leading from and returning to said hot water tank, a first heating medium supply adapted to lend heat to the water of circulation outside of said hot water tank, a thermostat subject to the temperature effect of returning water in the circulating line for controlling said first heating medium supply, and a second heating medium supply having a thermostat for controlling the same which is subject to temperature effect of returning water after receiving heat from the first heating medium supply.

8. In a system for delivering hot water for consumption, a hot water tank adapted to store water in quantities sufficient to instantly supply a demand and at a temperature appropriate to said demand, a supply line leading from said tank and a return flow line leading from said supply line back to said tank, means through which to draw water at will from said supply line, a first heating medium supply adapted to lend heat to the returning water of circulation before it reaches said tank, a first thermostat subject to the temperature effect of water returning through said return flow line for controlling said first heating medium supply, and a second heating medium supply having a thermostat for controlling the same, which is subject to temperature effect of returning water after said water has received heat from the first heating medium supply and before the water reaches the tank.

9. In a system of hot water circulation, a tank, a water circulating line, a steam pump for circulating water from and returning it to said tank through said line, a thermostat for controlling the said pump and which is subjected to temperature effect of water flowing through said line, a conduit for delivering exhaust steam from said pump to the water passing through said line, an auxiliary source of steam for discharging into the presence of the water returning through said line, and a thermostat subject to temperature effect of water flowing through said line, controlling the last named source of steam.

10. In a hot water supply system, a tank adapted to store water in quantities and at a temperature sufficient to instantly meet a demand, a circulating line through which water flows from and returns to said tank, and which is provided with means through which to draw hot water for consumption, a steam pump for forcing water through said line having means through which its output varies in accordance with the flow resistance through the line, a condenser for receiving exhaust steam from said pump and delivering the same for condensation by water returning from said line, a choke valve in said line for controlling the output of the pump by varying the resistance to the flow of water in the line and thereby varying the volume of exhaust steam from the pump, a first thermostat subject to temperature effect of water returning through the line and having a connection through which it controls said choke valve, a live steam supply communicating with said condenser and a second thermostat subject to the temperature effect of water of condensation in said condenser, and having a connection through which it controls said live steam supply.

Signed at Chicago, Illinois, this 28th day of August, 1919.

SPENCER OTIS.